US012141066B2

(12) United States Patent
Apte et al.

(10) Patent No.: US 12,141,066 B2
(45) Date of Patent: Nov. 12, 2024

(54) PROBE FILTER DIRECTORY MANAGEMENT

(71) Applicant: Advanced Micro Devices, Inc., Santa Clara, CA (US)

(72) Inventors: Amit P. Apte, Austin, TX (US); Kevin Michael Lepak, Austin, TX (US); Ganesh Balakrishnan, Austin, TX (US); Vydhyanathan Kalyanasundharam, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/556,649

(22) Filed: Dec. 20, 2021

(65) Prior Publication Data

US 2023/0195632 A1    Jun. 22, 2023

(51) Int. Cl.
*G06F 12/08* (2016.01)
*G06F 12/0811* (2016.01)
*G06F 12/0817* (2016.01)
*G06F 12/0891* (2016.01)
*G06F 13/16* (2006.01)

(52) U.S. Cl.
CPC ...... *G06F 12/0817* (2013.01); *G06F 12/0811* (2013.01); *G06F 12/0891* (2013.01); *G06F 13/1668* (2013.01)

(58) Field of Classification Search
CPC ............ G06F 12/0817; G06F 12/0811; G06F 12/0891; G06F 13/1668
See application file for complete search history.

(56) References Cited

U.S. PATENT DOCUMENTS

| 9,058,269 | B2 | 6/2015 | Krick et al. |
| 9,792,210 | B2 | 10/2017 | Conway |
| 2005/0273858 | A1* | 12/2005 | Zadok ............ H04L 67/06 709/230 |
| 2007/0055826 | A1 | 3/2007 | Morton et al. |

(Continued)

FOREIGN PATENT DOCUMENTS

KR    20160100170    *  8/2016  ............ G06F 11/073

OTHER PUBLICATIONS

International Search Report and Written Opinion for International Application No. PCT/US2022/052365 mailed Apr. 21, 2023, 6 pages.

(Continued)

*Primary Examiner* — Masud K Khan
(74) *Attorney, Agent, or Firm* — Polansky & Associates, P.L.L.C.; Paul J. Polansky

(57) ABSTRACT

A data processing system includes a plurality of coherent masters, a plurality of coherent slaves, and a coherent data fabric. The coherent data fabric has upstream ports coupled to the plurality of coherent masters and downstream ports coupled to the plurality of coherent slaves for selectively routing accesses therebetween. The coherent data fabric includes a probe filter and a directory cleaner. The probe filter is associated with at least one of the downstream ports and has a plurality of entries that store information about each entry. The directory cleaner periodically scans the probe filter and selectively removes a first entry from the probe filter after the first entry is scanned.

17 Claims, 3 Drawing Sheets

(56) References Cited

U.S. PATENT DOCUMENTS

| | | | |
|---|---|---|---|
| 2016/0350219 A1* | 12/2016 | Tune | G06F 12/0817 |
| 2017/0228316 A1* | 8/2017 | Steinmacher-Burow | G06F 12/084 |
| 2019/0163656 A1 | 5/2019 | Morton et al. | |
| 2019/0188137 A1* | 6/2019 | Kalyanasundharam | G06F 12/0811 |
| 2020/0081844 A1 | 3/2020 | Kalyanasundharam et al. | |
| 2020/0119753 A1* | 4/2020 | Chirca | G06F 12/0831 |
| 2020/0125490 A1 | 4/2020 | Blagodurov et al. | |
| 2020/0211152 A1* | 7/2020 | Benthin | G06F 12/0875 |
| 2020/0401519 A1 | 12/2020 | Kalyanasundharam et al. | |
| 2021/0191865 A1 | 6/2021 | Kalyanasundharam et al. | |

OTHER PUBLICATIONS

Amitabha Roy et al.; "ALLARM: Optimizing Sparse Directoriesf or Thread-Local Data"; white paper, Published in: 2014 Design, Automation & Test in Europe Conference & Exhibition; Mar. 2014; 6 pages.

* cited by examiner

PROBE FILTER DIRECTORY MANAGEMENT

BACKGROUND

Computer systems use main memory that is typically formed with inexpensive and high density dynamic random-access memory (DRAM) chips. However, DRAM chips suffer from relatively long access times. To improve performance, data processors typically include at least one local, high-speed memory known as a cache. In a multi-core data processor, each data processor core may have its own dedicated upper-level cache, while lower-level caches are shared by data processor cores. For example, a typical configuration includes four data processor cores each of which have their own dedicated L1 and L2 caches but share an L3 cache.

In more advanced computing systems, each multi-core processor can itself be interconnected with one or more other multi-core processors to form a data processing fabric. The data processing fabric can be connected to a large main memory organized into several distinct data channels.

In computer systems using such an architecture, special precautions must be taken to maintain coherency of data that may be used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol, each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

To maintain coherency, these systems use "probes" to communicate between various caches within the computer system. A probe is a message passed from a coherency point in the computer system to one or more caches in the computer system to determine if the caches have a copy of a block of data and optionally to indicate the state into which the cache should place the block of data. After a processing node receives a probe, it responds to the probe by taking appropriate action.

The bandwidth associated with sending and responding to probes can quickly become a limiting factor in performance, particularly for systems that employ large numbers of processors. In such systems, it is known to include a probe filter to reduce the bandwidth requirements by filtering out unnecessary probes. While probe filters can reduce system traffic and access latency, they require a large amount of storage space to maintain the state of all cache lines in the system. Moreover, if the size of the memory that needs to be looked up is too large, the probe filter may add a clock cycle delay between an access request and the determination that no probe needs to be issued.

Because of these limitations, it is known to implement a probe filter as a "region" probe filter, wherein the region size is larger than the cache line size. Rather than maintaining a record of the state of each cache line in the local memory that is cached somewhere in the data processing system, a region probe filter identifies a region that contains at least one cache line cached somewhere in the data processing system. An occasional attempted access that misses in the cache is more than offset by the cost savings due to the reduction in area by using the region probe filter compared to using a line probe filter.

However, the use of a region probe filter causes a problem in that over time, the region probe filter becomes cluttered with "plaque" or unwanted buildup caused by region entries that are associated with cache lines that have been evicted from the corresponding caches, but whose evictions are not evident because of the larger span of addresses covered by the region probe filter.

Figure 1:
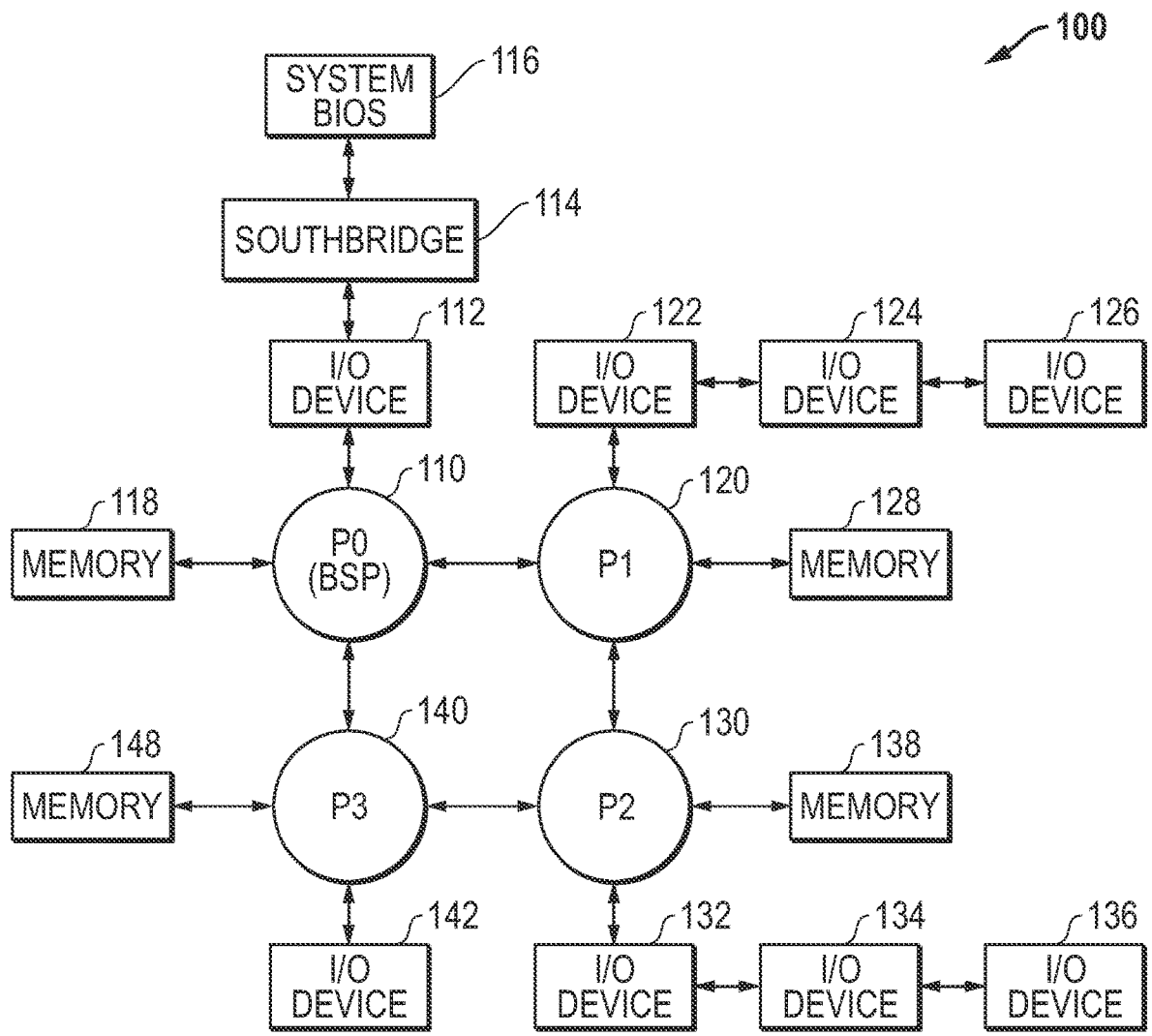
FIG. 1 illustrates in block diagram form a data processing system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

A data processing system includes a plurality of coherent masters, a plurality of coherent slaves, and a coherent data fabric. The coherent data fabric has upstream ports coupled to the plurality of coherent masters and downstream ports coupled to the plurality of coherent slaves for selectively routing accesses therebetween. The coherent data fabric includes a probe filter and a directory cleaner. The probe filter is associated with at least one of the downstream ports and has a plurality of entries that store information about each entry. The directory cleaner periodically scans the probe filter and selectively removes a first entry from the probe filter after the first entry is scanned.

A coherent data fabric for a data processing system includes a plurality of upstream ports, a plurality of downstream ports, a crossbar router, a probe filter, and a directory cleaner. The plurality of upstream ports is adapted to be coupled to a plurality of coherent masters. The plurality of downstream ports is adapted to be coupled to memory resources. The crossbar router selectively couples the plurality of upstream ports to the plurality of downstream ports. The probe filter is associated with at least one of the plurality of downstream ports and has a plurality of entries that store information about each entry. The directory cleaner periodically scans the probe filter and selectively removes a first entry from the probe filter after the first entry is scanned.

A method of periodically cleaning entries of at least one probe filter of a data processing system includes initializing a timer of a directory cleaner. A next entry in the at least one probe filter is read based on a value of the timer. If the next entry is valid, the next entry is selectively removed from the at least one probe filter using the directory cleaner in response to an indication that the next entry references a data element that is not cached in any cache in the data processing system.

FIG. 1 illustrates in block diagram form a data processing system 100 known in the prior art. Data processing system 100 includes a set of four processing nodes 110, 120, 130, and 140 labeled "P0", "P1", "P2", and "P3", respectively.

Each processing node is interconnected to two adjacent processing nodes by a bidirectional high-speed data link. For example, processing node 110 is connected to processing nodes 120 and 140 by respective high-speed data links. Each of processing nodes 120, 130, and 140 is connected to two adjacent processing nodes using other respective high-speed data links.

As shown in FIG. 1, each processing node has three associated high-speed data links. Since data processing system 100 includes four processing nodes, each processing node uses two of the available links to connect to adjacent processing nodes, leaving one available high-speed data link that can be used for another purpose. For the example shown in FIG. 1, processing node 110 is connected to an input/output (I/O) device 112 using the remaining high-speed data link. I/O device 112 in turn is connected to a low-speed peripheral hub known as a "Southbridge" 114. Southbridge 114 in turn is connected to a basic input/output system (BIOS) memory 116 which acts as the BIOS for system 100, and since processing node 110 executes the BIOS, it is known as the BIOS service processor (BSP). Processing node 120 is connected to an I/O device 122, which is connected to an I/O device 124, which is in turn connected to an I/O device 126. These I/O devices could be, for example, a peripheral component interconnect (PCI) express (PCIe) bus in which I/O device 122 is a PCIe root complex, I/O device 124 is a PCIe hub, and I/O device 126 is a PCIe endpoint device. Processing node 130 is connected in the same manner to an I/O device 132, which is connected to an I/O device 134, which is in turn connected to an I/O device 136. Processing node 140 is connected to a single I/O device 142.

Each processing node also has an associated memory. Thus, processing node 110 has an associated memory 118, processing node 120 has an associated memory 128, processing node 130 has an associated memory 138, and processing node 140 has an associated memory 148. Each processing node connects to its respective memory using an integrated memory controller. Together, memories 118, 128, 138, and 148 form a unified system memory accessible to each processing node. Since it takes a longer amount of time for a processing node to access a remote memory than it does a local memory because of the need for the memory access requests to "hop" around the network, data processing system 100 implements a non-uniform memory architecture (NUMA). The network of processors using inter-processor links to adjacent processors is one exemplary architecture of a distributed multi-processor data processing system. Another exemplary architecture substitutes a large crossbar network for the point-to-point links.

Each processing node maintains a separate cache hierarchy. The cache hierarchy contains one or more levels of local, high-speed memory known as caches that contain the most recently accessed memory locations of that distributed memory system. By using the principle of locality of reference, each cache hierarchy allows its respective data processing node to operate efficiently to reduce the number of data accesses, especially data accesses that may take a long time to "hop" around one or more inter-processor links.

Because the distributed memory forms a unified system memory that is accessible to multiple processing nodes, and multiple processing nodes may need to access the same data, it is important to maintain coherency of the data in data processing system 100. In general, coherency means that the state of the memory system looks the same to all processing nodes, so that if different program threads are assigned to processing nodes, they will not cause program failure by processing inconsistent copies of the data.

Data processing system 100 preserves coherency by maintaining a "probe filter" associated with each node that is connected to local memory. The probe filter keeps track of which processing nodes have copies of data elements, and which processing node "owns" the data element, and whether the owner has modified the data. For example, assume a particular data element is associated with processing node 110 but processing node 110 has a copy in its cache hierarchy and has modified it. A probe filter associated with processing node 110 ensures that if processing node 120 attempts to access it, then the modified copy of the data in the cache hierarchy is fetched and forwarded to processing node 120, rather than the stale or "dirty" copy in memory 118.

According to various embodiments that will now be described, a data processing system includes a directory cleaner that periodically cleans entries that may have become stale. In other words, it provides a mechanism to "floss" the region probe filters to target and remove the "plaque" that has built up over time.

Figure 2:
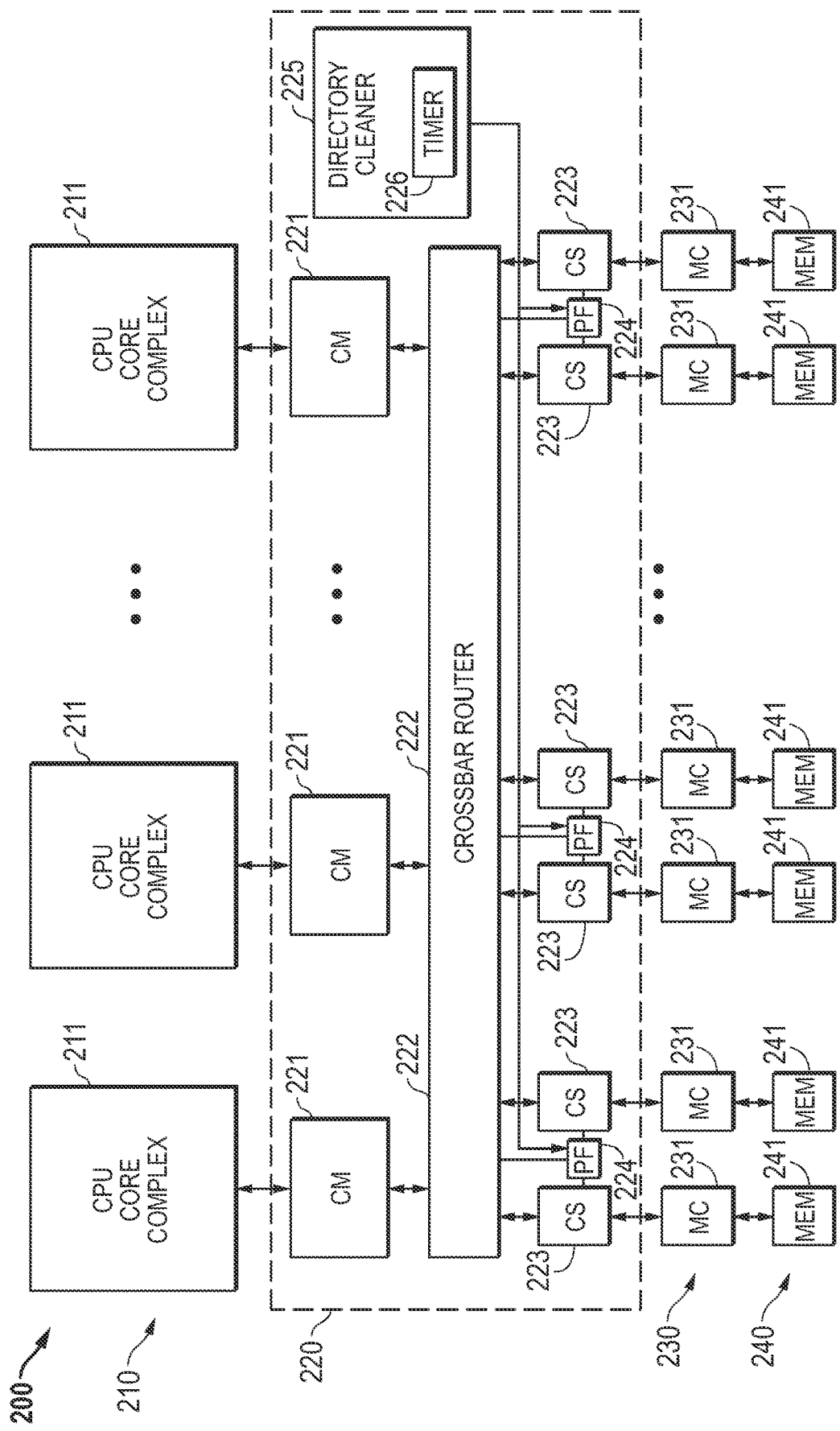
FIG. 2 illustrates in block diagram form a data processing system according to some embodiments.

FIG. 2 illustrates in block diagram form a data processing system 200 according to some embodiments. Data processing system 200 includes a set of coherent masters 210, a data fabric 220, a set of coherent slaves 230, and a main memory 240. In the example shown in FIG. 2, coherent masters 210 include a set of central processing unit (CPU) core complexes each numbered 211. Each CPU core complex 211 includes multiple individual CPU cores. In one typical implementation, each CPU core has its own level one (L1) and level two (L2) instruction and/or data caches, while CPU core complex 211 has a shared level three (L3) instruction and data cache.

Data fabric 220 includes a set of upstream ports 221, a crossbar router 222, a set of downstream ports 223, a set of probe filters 224, and a directory cleaner 225. Each upstream port 221 has a first bidirectional connection to a coherent master, in this example one of CPU core complexes 211, and thus is labelled "CM", and a bidirectional connection to crossbar router 222. Each downstream port 223 has a first bidirectional connection to crossbar router 222, and a second bidirectional connection to one of memory controllers 231, and thus is labelled "CS". Each probe filter 224 is connected to crossbar router 222 and to two downstream ports 223, and has a control input. Directory cleaner 225 has an output connected to each probe filter 224, and has an internal timer 226.

Coherent slaves 230 include a set of memory controllers 231 each labelled "MC". Each coherent slave 231 has a first bidirectional port connected to a respective downstream port 223 of data fabric 220, and a second bidirectional port.

Main memory 240 include a set of memories 241 each labelled "MEM". Each memory 241 is bidirectionally connected to the second bidirectional port of a corresponding memory controller 231. Each memory 241 can be formed using a type of mass storage memory, such a dynamic random-access memory (DRAM), non-volatile memory with persistent storage (NVDIMM-P), and the like. Together, each memory controller 231 and its associated memory 241 form a memory channel.

Data processing system 200 is a large system with many processing elements and many memory channels forming a large distributed main memory 240. Data processing system 200 is thus useful in server and data center applications. However instead of using multiple point-to-point interconnects as shown in FIG. 1, data processing system 200 using a data fabric 220 to route memory access requests from CPU core complexes 211 to memories 241 using memory controllers 231.

In order to determine the proper routing of accesses, each memory channel formed has an associated address space and an associated probe filter 224. In the implementation of FIG. 2, each probe filter 224 is associated with two memory channels, but in other implementations, each probe filter can be associated with only one memory channel or with more than two memory channels.

Each probe filter 224 implements a directory of memory elements associated with the memory channels to which it is connected that are stored in any processing node in data processing system 200. In the example of FIG. 2, each probe filter 224 is a region probe filter in which it indicates which regions of main memory 240 contain a cache line cached somewhere in data processing system 200, as well as the owner of the cache line, and various other state information such as which processing node owns the data, which processing nodes maintain copies of the data, whether the data has been modified, etc.

According to various implementation s described further below, directory cleaner 225 periodically scans each probe filter 224 in data processing system 200 and selectively removes entries in response to the scanning. One useful criterion is whether the cache line indicates that it may contain "plaque" or unwanted buildup of stale probe filter entries. The stale probe filter entries that cause "plaque" can be region probe filter entries in which cache lines that caused the region to be allocated to the cache and recorded in the probe filter are later evicted from the corresponding caches, but without the notice of the probe filter. This problem may occur more frequently as the number of CPU caches and the number of lines in the caches grows, and can also occur more frequently when the operating system migrates workload between CPU cores.

In particular, directory cleaner 225 uses a timer 226 to scan through the entire set of regions whose state is recorded in a probe filter 224. For example, directory cleaner 225 can index through each probe filter 224, and each entry in the probe filter in an order. There are various rules that directory cleaner 225 can use to determine whether to remove the line from the probe filter. For example, directory cleaner 225 would automatically skip cleaning any lines that are already in the invalid state.

The lines chosen for removal would vary in different implementations. In some implementations, directory cleaner 225 removes all valid entries on the periodic basis. In other implementations, directory cleaner 225 removes a more targeted approach by removing lines where "plaque" is especially likely to build up, such as shared lines in a region probe filter.

In some implementations, directory cleaner 225 removes all valid entries that are in the shared state, skipping entries that are only stored in a single processing node. This implementation has the benefit that it specifically targets only entries that are more likely to form "plaque", i.e., having only one associated cache line in a region that was stored in a cache but that has been subsequently evicted from the owner's cache but not removed from the probe filter.

In order to remove a region entry from a probe filter 224, directory cleaner 225 causes the specific probe filter 224 containing the entry to send invalidating probes to all processing nodes that may contain copies of the data. In this case, any node that has modified the data will write back the modified data to main memory 240 and evict the corresponding lines from all caches, whereas the processing nodes that only maintain unmodified copies of the data will evict the cache lines but require no writeback. Once all writebacks have been completed, then probe filter 224 removes the entry, e.g., by simply invalidating the entry, thus making it available for subsequent use.

In some implementations, an additional mechanism can coexist with the periodic cleaning techniques. In this implementation, each probe filter entry maintains an "aggregate reference count" that is equal to the difference between the number of memory accesses to that region compared to the number of evictions from that region. When the entry is first added to the probe filter, the aggregate reference count is increased to one. When the aggregate reference count subsequently reaches zero, indicating that the entry may have been evicted from all caches so that no cache still includes any cache line to the region in its cache directory, then the entry is reclaimed and removed from the probe filter without the need to send any coherency probes (since the data for the entry has been evicted from all caches). This mechanism was previously known. However, in certain circumstances, the aggregate reference count may cause "plaque" in the system. For example, if the aggregate reference count saturates, i.e., it reaches its maximum value, possibly because the counter has too few bits, then it may never thereafter accurately decrement to zero to indicate that no caches in the system currently cache the data. In this situation, the natural reclaiming process does not work, but directory cleaner 225 can remove it when detected and the probe filter can send invalidating probes to all CPU core complexes that are indicated as having copies of a cache line from the associated region.

Figure 3:
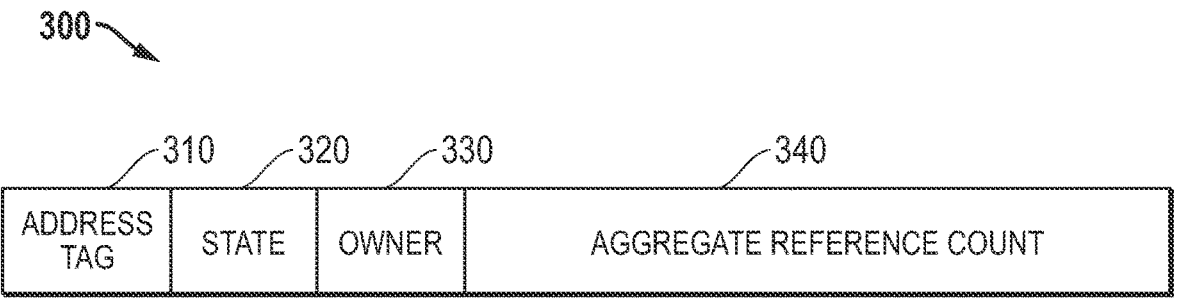
FIG. 3 illustrates in block diagram form an entry of the probe filter of FIG. 2 according to some embodiments.

FIG. 3 illustrates in block diagram form a portion of an entry 300 of probe filter 224 of FIG. 2 according to some embodiments. Entry 300 has an ADDRESS TAG field 331 that contains address bits that identify the region. For example, if probe filter 224 is a region probe filter and each cache line is 64 bytes in size but the region is 4 kilobytes (4 kB) in size, ADDRESS TAG field 331 would include all address bits except the twelve least-significant bits.

Entry 300 contains a STATE field 320. STATE field 320 contains state bits that are similar to the state bits in a cache line of a cache. For example, STATE field 320 can support the "MOESI" protocol as described above. However regardless of the implementation entry 300 includes bits to indicate shared cache lines.

Entry 300 also contains an OWNER field 330. OWNER field 330 indicates the processor socket that owns the data, i.e., an indication of the location of the CPU core complex that stores the data and has modified it. It is this node that must writeback any dirty data to main memory before invalidating the cache line.

Finally, entry 300 includes an AGGREGATE REFERENCE COUNT field 340. AGGREGATE REFERENCE COUNT field 340 is incremented when the probe filter adds the entry and is incremented for each access to the corresponding entry, but is decremented when the entry is evicted from any cache. When AGGREGATE REFERENCE COUNT field 340 returns to zero, then probe filter 224 sends invalidating probes to all processing nodes that have a copy of the data, and subsequently removes the line from probe filter 224.

Figure 4:
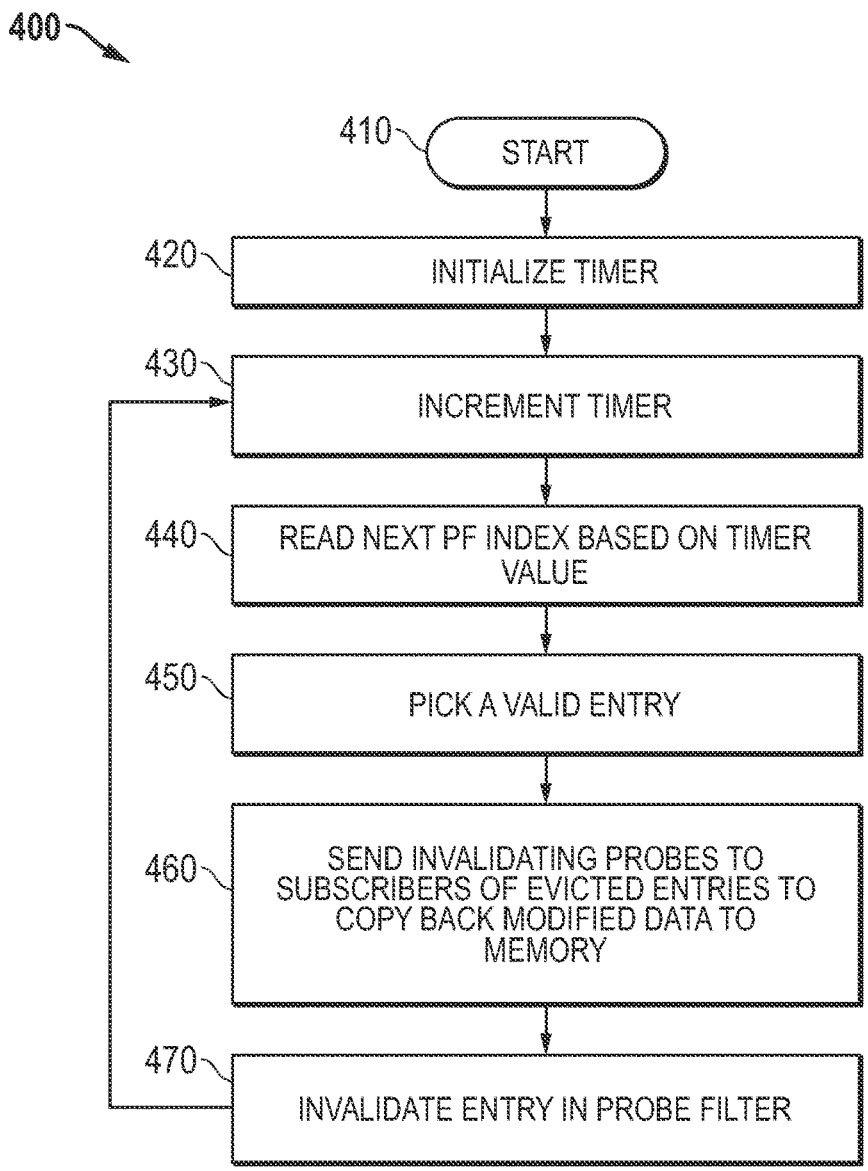
FIG. 4 illustrates a flow chart showing the operation of the directory cleaner of FIG. 2 according to some embodiments.

FIG. 4 illustrates a flow chart 400 showing the operation of directory cleaner 225 of FIG. 2 according to some embodiments. In flow chart 400, directory cleaner 225 starts the cleaning process in an action box 410. In an action box 420, directory cleaner 225 initializes timer 226. In an action box 430, directory cleaner 225 increments timer 226. At this point, the output of timer 226 indicates, directly or indirectly, a next probe filter entry stored in data fabric 220. In an action box 440, directory cleaner 225 reads a next probe filter index based on the timer. The probe filter index points to the next entry in one of probe filters 224 for the scanning operation. In an action box 450, directory cleaner 225 picks a valid entry from the probe filter. Assuming there is a valid entry, then in an action box 460, directory cleaner 225 sends (or commands the respective probe filter 424 to send) invalidating probes to all subscribers of the entry to copy back modified data to main memory. In this context, a subscriber is a data processing node that has a copy, modified or unmodified, of the data of the entry in its cache hierarchy. Once the invalidating probes are acted upon, then the subscriber nodes can evict the lines from their caches. Then in an action box 470, the respective probe filter 224 invalidates the entry, e.g., by marking the state of the entry as invalid. This entry is now available for re-allocation to another region when it is referenced in the future based on program flow.

Flow chart 400 assumes that the next entry is valid in action box 450. If, however, the next entry is not valid, then directory cleaner 225 advances to the next probe filter index by returning to action box 430 without taking further action. In some embodiments, if the next entry is invalid, then flow returns to action box 430 and the flossing process only continues when timer 226 is periodically incremented.

The speed at which directory cleaner 225 indexes through the entries in all probe filters 424 is slow enough so that the invalidation of entries containing cache lines that are subsequently accessed by at least one CPU core does not significantly affect program execution time or user experience. The period of timer 226 can then be based on the particular characteristics of the system such as the total number of CPU cores, the number of CPU caches, the number of lines in the caches, the degree of multi-threading and workload migration among the CPU cores, and the use of region probe filters instead of a line probe filters.

Thus, directory cleaner 225 works well in a large, distributed data processing system like data processing system 200 to periodically remove entries that become "sticky" over time due to the complexity of data processing system 200. The removal of entries (and eviction from corresponding CPU caches) from probe filters 224 is slow enough so that the removed entries can be restored on a subsequent program reference without significantly slowing down the system. If the entries are restored, the states will be updated only upon subsequent usage by certain data processing nodes, so that the "sticky" states are removed and refreshed from the probe filters. This mechanism works in conjunction with other mechanisms such as random removal and removal based on an aggregate reference count. Thus, it allows computers with larger distributed processing and memory fabrics to be built for applications such as servers and data centers at lower cost.

An integrated circuit that implements the directory cleaner for probe filters may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular implementations have been described, various modifications to these implementations will be apparent to those skilled in the art. For example, while the disclosed flossing technique is especially useful in systems with large numbers of CPU cores that share cache lines using region probe filters, it is also applicable to probe filters that track the state of individual cache lines. Moreover, the flossing technique is useful in conjunction with other probe filter directory management techniques, such as replacement based on an aggregate reference count, replacement based on random selection, replacement based on a typical way replacement scheme to make room for a new entry. In general, directory cleaner 225 can determine a likelihood of an entry being "plaque", i.e., implementation as a region probe filter, the entry being in a shared state, or an indication that an aggregate reference counter has saturated. While in the exemplary implementation, each probe filter 224 was connected to two downstream ports, in various implementations the probe filters can be connected to only a single downstream port or to more than two downstream ports.

Accordingly, it is intended by the appended claims to cover all modifications of the disclosed embodiments that fall within the scope of the disclosed embodiments.

What is claimed is:

1. A data processing system, comprising:
a plurality of coherent masters;
a plurality of coherent slaves; and
a coherent data fabric having upstream ports coupled to said plurality of coherent masters and downstream ports coupled to said plurality of coherent slaves for selectively routing accesses therebetween, said coherent data fabric comprising:
a probe filter associated with at least one of said downstream ports and having a plurality of entries that store information about each entry, wherein said probe filter comprises a region probe filter that stores a shared state to indicate that a corresponding region of memory is shared between multiple processing nodes in the data processing system; and
a directory cleaner that periodically scans all entries of said probe filter and selectively removes a first entry from said probe filter if said first entry has been evicted from corresponding caches.

2. The data processing system of claim 1, wherein:
said directory cleaner comprises a timer that establishes a rate that said directory cleaner periodically scans said plurality of entries in said probe filter.

3. The data processing system of claim 1, wherein said directory cleaner selectively removes said first entry by:
sending invalidating probes to any coherent master that has a copy of data of said first entry to write back modified data from their corresponding cache hierarchies; and
removing said first entry from said probe filter.

4. The data processing system of claim 1, wherein said probe filter is a line probe filter and said directory cleaner selectively removes said first entry in response to said information indicating that said first entry is in said shared state among said plurality of coherent masters.

5. The data processing system of claim 1, wherein said directory cleaner selectively removes said first entry from said region probe filter in response to said information indicating that said first entry is in said shared state among said plurality of coherent masters.

6. The data processing system of claim 1, wherein said information comprises an aggregate reference count that indicates a difference between a number of accesses to a region and a number of evictions from said region, wherein said directory cleaner further removes said first entry in response to said aggregate reference count saturating.

7. The data processing system of claim 1, further comprising:
a plurality of additional probe filters associated with at least one of said downstream ports and having a plurality of entries storing information about data from corresponding memory resources that is cached in the data processing system,
wherein said directory cleaner periodically scans entries in said plurality of additional probe filters and selectively removes a second entry from a corresponding one of said plurality of additional probe filters if said second entry has been evicted from said corresponding caches.

8. A coherent data fabric for a data processing system, comprising:
a plurality of upstream ports adapted to be coupled to a plurality of coherent masters;
a plurality of downstream ports adapted to be coupled to memory resources;
a crossbar router for selectively coupling said plurality of upstream ports to said plurality of downstream ports;
a probe filter associated with at least one of said plurality of downstream ports and having a plurality of entries that store information about each entry, wherein said probe filter comprises a region probe filter that stores a shared state to indicate that a corresponding region of memory is shared between multiple processing nodes in the data processing system; and
a directory cleaner that periodically scans all entries of said probe filter and selectively removes a first entry from said probe filter if said first entry has been evicted from corresponding caches.

9. The coherent data fabric of claim 8, wherein:
said directory cleaner comprises a timer that establishes a rate that said directory cleaner periodically scans said plurality of entries in said probe filter.

10. The coherent data fabric of claim 8, wherein said directory cleaner selectively removes said first entry by:
sending invalidating probes to any of said plurality of upstream ports that are coupled to coherent masters that have a copy of data of said first entry to write back modified data from their corresponding cache hierarchies; and
removing said first entry from said probe filter.

11. The coherent data fabric of claim 8, wherein said probe filter is a line probe filter and said directory cleaner selectively removes said first entry in response to said information indicating that said first entry is in said shared state among said plurality of coherent masters.

12. The coherent data fabric of claim 8, wherein said directory cleaner selectively removes said first entry from said region probe filter in response to said information indicating that said first entry is in said shared state among said plurality of coherent masters.

13. The coherent data fabric of claim 8, wherein said information comprises an aggregate reference count that indicates a difference between a number of accesses to a region and a number of evictions from said region, wherein said directory cleaner further removes said first entry in response to said aggregate reference count saturating.

14. A method of periodically cleaning entries of at least one probe filter of a data processing system, comprising:
initializing a timer of a directory cleaner;
reading a next entry in the at least one probe filter based on a value of said timer;
if said next entry is valid, selectively removing said next entry from the at least one probe filter using said directory cleaner if said next entry references a data element that is not cached in any cache in the data processing system; and
repeating said reading and said selectively removing periodically for all entries of the at least one probe filter, wherein the at least one probe filter comprises a region probe filter.

15. The method of claim 14, further comprising:
maintaining an aggregate reference count of entries in the at least one probe filter, said aggregate reference count indicating a difference between accesses and evictions to a region of said entry; and
removing said next entry from the at least one probe filter in response to said aggregate reference count saturating.

16. The method of claim 14, further comprising:
selectively removing said next entry comprises removing said next entry in response to said next entry being in a shared state among a plurality of coherent masters.

17. The method of claim 14, wherein selectively said next entry from the at least one probe filter comprises:
sending invalidating probes to any of a plurality of processing nodes in the data processing system that have copies of data of said next entry to write back a modified copy of said data from their corresponding cache hierarchies; and
removing said next entry in the at least one probe filter.

* * * * *